United States Patent
Xie (10) Patent No.: US 10,403,282 B2
(45) Date of Patent: Sep. 3, 2019

(54) METHOD AND APPARATUS FOR PROVIDING VOICE SERVICE

(71) Applicant: Baidu Online Network Technology (Beijing) Co., Ltd., Beijing (CN)

(72) Inventor: Bo Xie, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/049,298

(22) Filed: Jul. 30, 2018

(65) Prior Publication Data

US 2019/0096400 A1 Mar. 28, 2019

(30) Foreign Application Priority Data

Sep. 26, 2017 (CN) .......................... 2017 1 0883349

(51) Int. Cl.
*G10L 15/00* (2013.01)
*G10L 15/22* (2006.01)
*G10L 15/04* (2013.01)
*G10L 25/51* (2013.01)

(52) U.S. Cl.
CPC .............. *G10L 15/22* (2013.01); *G10L 25/51* (2013.01); *G10L 2015/223* (2013.01)

(58) Field of Classification Search
CPC .... G10L 15/22; G10L 25/51; G10L 2015/223

USPC ......................................................... 704/251
See application file for complete search history.

(56) References Cited

U.S. PATENT DOCUMENTS

2017/0223189 A1* 8/2017 Meredith ............ H04M 3/5233

* cited by examiner

*Primary Examiner* — Thierry L Pham
(74) *Attorney, Agent, or Firm* — Knobbe Martens Olson & Bear LLP (57) ABSTRACT

The present disclosure discloses a method and apparatus for providing a voice service. A specific implementation of the method for providing a voice service comprises: acquiring a voice input signal; analyzing the time-domain waveform of the voice input signal to determine current speed information of the voice input signal; comparing the current speed information with an acquired standard speed information set of a user outputting the voice input signal, and determining first demand information from a preset demand information set according to the comparison result, wherein the standard speed information set comprises at least one piece of standard speed information, and the preset demand information set comprises demand information corresponding to each piece of standard speed information in the standard speed information set; and generating a voice response signal based on the first demand information and the second demand information acquired by analyzing the voice input signal.

11 Claims, 5 Drawing Sheets

METHOD AND APPARATUS FOR PROVIDING VOICE SERVICE

CROSS-REFERENCE TO RELATED APPLICATIONS

This application claims priority to Chinese Patent Application No. 201710883349.8, filed with the State Intellectual Property Office of the People's Republic of China (SIPO) on Sep. 26, 2017, the content of which is incorporated herein by reference in its entirety.

TECHNICAL FIELD

The present disclosure relates to the field of computer technology, particularly relates to the field of voice technology, in particular to a method and apparatus for providing a voice service.

BACKGROUND

Artificial intelligence (AI) is a new technical science that researches and develops theories, methods, technologies and application systems to simulate, extend and expand human intelligence. Artificial intelligence is a branch of the computer science, and attempts to understand the essence of intelligence and produce a new intelligent machine that is capable of responding in a way similar to human intelligence. Research in this field includes robots, voice recognition, image recognition, natural language processing and expert system.

Voice recognition technology within the artificial intelligence field is an important direction in the computer science and artificial intelligence, and it is mainly used in intelligent voice service technology to recognize voice signals provided by users, then generate response information on the basis of the recognized results, and convert the response information into voice signals for output through voice synthesis technology.

Most existing voice service technologies convert voice signals into corresponding characters when responding to voice service requests output by users, and then analyze and search the characters to determine response strategies. However, in this process, different potential demand information contained in different speeds of speakers is ignored, which leads to a poor match between the provided voice service and the demand of a user.

SUMMARY

In order to solve the one or more technical problems as mentioned in the Background, the embodiments of the present disclosure provide a method and apparatus for providing a voice service.

In a first aspect, the embodiments of the present disclosure provide a method for providing a voice service, comprising: acquiring a voice input signal; analyzing the time-domain waveform of the voice input signal to determine current speed information of the voice input signal;

comparing the current speed information with an acquired standard speed information set of a user outputting the voice input signal, and determining first demand information from a preset demand information set according to a comparison result, wherein the standard speed information set comprises at least one piece of standard speed information, and the preset demand information set comprises demand information corresponding to each piece of standard speed information in the standard speed information set; and generating a voice response signal based on the first demand information and the second demand information acquired by analyzing the voice input signal.

In some embodiments, the comparing the current speed information with an acquired standard speed information set of a user outputting the voice input signal, and determining first demand information from a preset demand information set according to the comparison result comprises: comparing the current speed information with the acquired standard speed information set of the user outputting the voice input signal to determine from the standard speed information set target standard speed information matching the current speed information; and finding, in the preset demand information set, demand information corresponding to the target standard speed information as the first demand information.

In some embodiments, before the comparing the current speed information with the acquired standard speed information set of the user outputting the voice input signal, and the determining first demand information from the preset demand information set according to the comparison result, the method also comprises: identifying the user outputting the voice input signal on the basis of the voice input signal; and acquiring the standard speed information set of the identified user.

In some embodiments, the generating a voice response signal based on the first demand information and the second demand information acquired by analyzing the voice input signal comprises: generating at least one candidate voice signal responding to the voice input signal on the basis of the second demand information; and calculating a degree of association between the each candidate voice signal and the first demand information, and determining the voice response signal from the candidate voice signal according to the degree of association.

In some embodiments, the method further comprises building the standard speed information set of the user, comprising: acquiring a historical voice service record associated with the user, the historical voice service record comprising speed information of a historical voice input signal output by the user, a historical voice response signal and feedback information of the user to a historical voice service; selecting a historical voice response signal corresponding to a historical voice service having the feedback information being positive feedback information as a sample voice response signal, and selecting speed information of a historical voice input signal corresponding to the historical voice service having the feedback information being positive feedback information as sample speed information; and analyzing the sample voice response signal to determine corresponding third demand information associated with speed, clustering the voice response signal on the basis of the third demand information, and generating the each standard speed information according to the sample speed information corresponding to the voice response signal in each cluster.

In a second aspect, the embodiments of the present disclosure provide an apparatus for providing a voice service, comprising: an acquisition unit, configured for acquiring a voice input signal; an analysis unit, configured for analyzing a time-domain waveform of the voice input signal to determine current speed information of the voice input signal; a determination unit, configured for comparing the current speed information with an acquired standard speed information set of a user outputting the voice input signal, and determining first demand information from a preset demand information set according to a comparison result, wherein the standard speed information set comprises at least one piece of standard speed information, and the preset demand information set comprises demand information corresponding to each piece of standard speed information in the standard speed information set; and a generation unit, configured for generating a voice response signal based on the first demand information and the second demand information acquired by analyzing the voice input signal.

In some embodiments, the determination unit is further configured for determining the first demand information by: comparing the current speed information with an acquired standard speed information set of the user outputting the voice input signal to determine from the standard speed information set target standard speed information matching the current speed information; and finding, in the preset demand information set, demand information corresponding to the target standard speed information as the first demand information.

In some embodiments, the apparatus further comprises an identification unit, configured for, before comparing the current speed information with an acquired standard speed information set of a user outputting the voice input signal and determining first demand information from a preset demand information set according to the comparison result: identifying the user outputting the voice input signal on the basis of the voice input signal; and acquiring the standard speed information set of the identified user.

In some embodiments, the generation unit is further for generating the voice response signal by:
generating at least one candidate voice signal responding to the voice input signal on the basis of the second demand information; and calculating a degree of association between the each candidate voice signal and the first demand information, and determining the voice response signal from the candidate voice signal according to the degree of association.

In some embodiments, the apparatus further comprises a building unit configured for building the standard speed information set of the user, the building unit being configured for: acquiring a historical voice service record associated with the user, the historical voice service record comprising speed information of a historical voice input signal output by the user, a historical voice response signal and feedback information of the user to a historical voice service; selecting a historical voice response signal corresponding to a historical voice service having the feedback information being positive feedback information as a sample voice response signal, and selecting speed information of a historical voice input signal corresponding to the historical voice service having the feedback information being positive feedback information as sample speed information; and analyzing the sample voice response signal to determine corresponding third demand information associated with speed, clustering the voice response signal on the basis of the third demand information, and generating each standard speed information based on the sample speed information corresponding to the voice response signal in each cluster.

The method and apparatus for providing a voice service as provided by the embodiments of the present disclosure may improve the match between a voice service and the potential demand of a user, thereby making the voice service more flexible and more accurate by: acquiring a voice input signal; performing frequency analysis on the voice input signal to determine current speed information of the voice input signal; comparing the current speed information with an acquired standard speed information set of a user outputting the voice input signal, and determining first demand information from a preset demand information set according to the comparison result, wherein the standard speed information set comprises at least one piece of standard speed information, and the preset demand information set comprises demand information corresponding to each standard speed information in the standard speed information set; and finally generating a voice response signal based on the first demand information and the second demand information acquired by analyzing the voice input signal.

BRIEF DESCRIPTION OF THE DRAWINGS

Other features, objects, and advantages of the present disclosure will become more apparent by reading the detailed description about the non-limiting embodiments with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
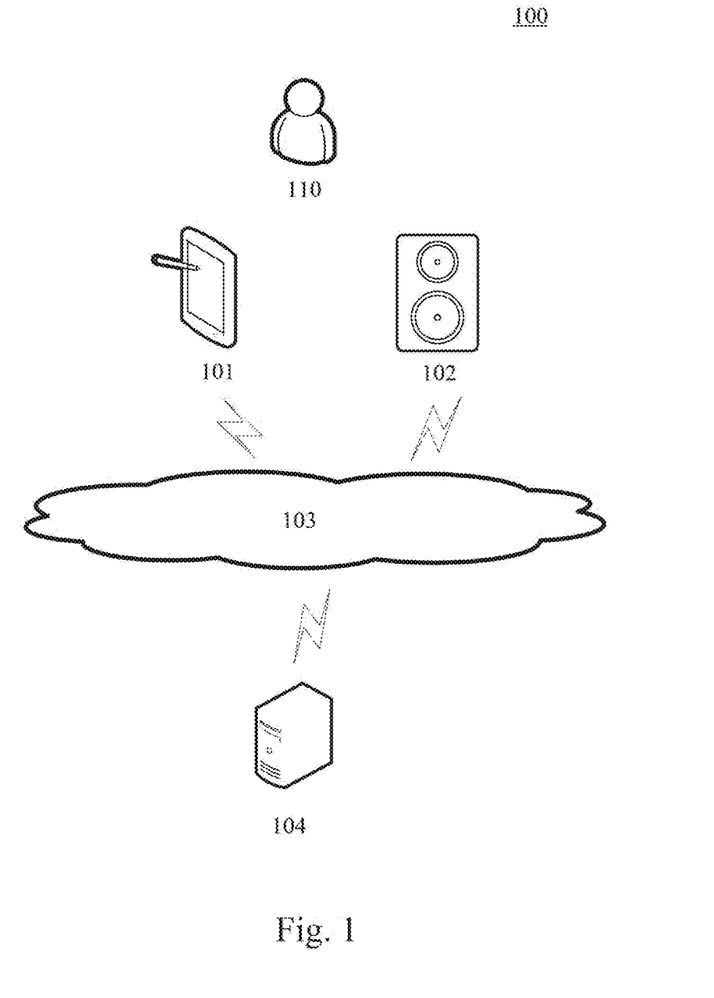
FIG. 1 is an architectural diagram of an exemplary system architecture in which embodiments of the present disclosure may be applied.

FIG. 1 shows an exemplary architecture of a system 100 which may be used by a method for providing voice service or apparatus for providing voice service according to the embodiments of the present disclosure.

As shown in FIG. 1, the system architecture 100 may include terminal devices 101 and 102, a network 103 and a server 104. The network 103 serves as a medium providing a communication link between the terminal devices 101 and 102 and the server 104. The network 103 may include various types of connections, such as wired or wireless transmission links, or optical fibers.

The user 110 may use the terminal devices 101, 102 interact with the server 104 through the network 103, in order to transmit or receive messages, etc. Various voice interaction applications may be installed on the terminal devices 101 and 102.

The terminal devices 101 and 102 may be various electronic devices having audio input interface and audio output interface and supporting internet access, including but not limited to, smart phones, tablet computers, smart watch, e-book and smart speaker.

The server 104 may be a voice server that provides support for voice service. The voice server may receive voice interaction requests from the terminal devices 101 and 102 and analyze the voice interaction requests, then search for corresponding service data, generate response data, then return the generated responsed data to the terminal device 101 and 102.

It should be noted that a method for providing voice service according to some embodiments of the present disclosure is generally executed by the server 104. Accordingly, an apparatus for providing voice service is generally installed on the server 104.

It should be understood that the number of terminal devices, networks, servers in FIG. 1 is merely illustrative. According to implementation needs, there can be any number of terminal devices, networks and servers.

Figure 2:
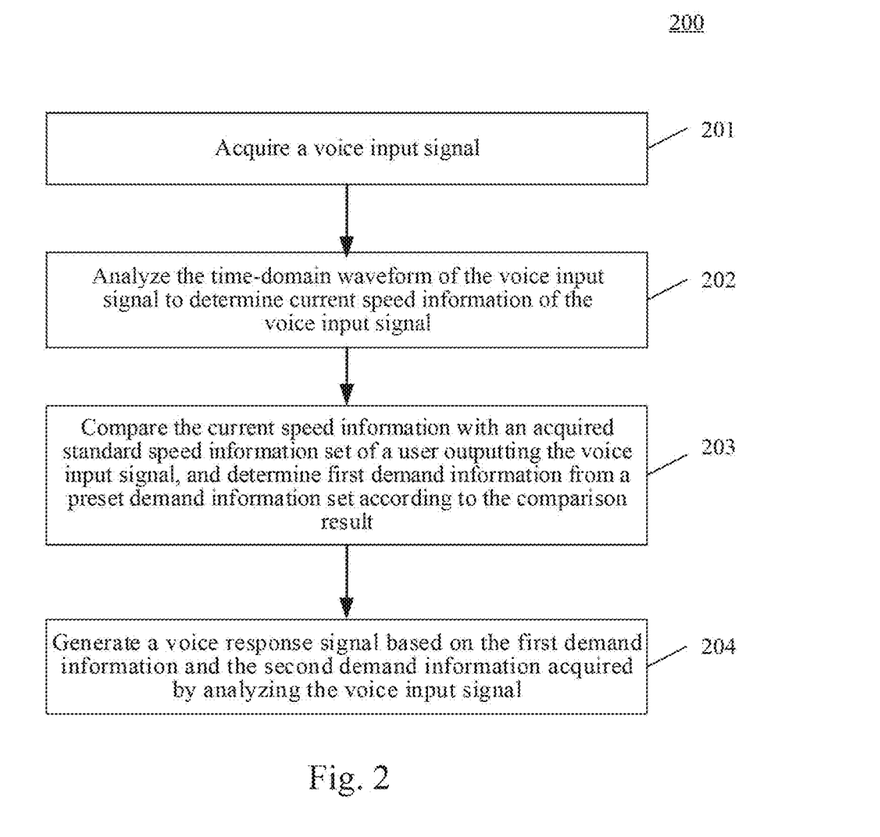
FIG. 2 is a flowchart of a method for providing a voice service according to an embodiment of the present disclosure.

Further referring to FIG. 2 which shows a flow 200 of a method for providing a voice service according to an embodiment of the present disclosure. The method for providing a voice service comprises:

Step 201: acquiring a voice input signal.

In the present embodiment, an electronic device (such as the server shown in FIG. 1) the method for providing a voice service runs thereon may acquire a voice input signal generated based on voice information output by a user through the network. Specifically, the electronic device may establish a connection to a terminal device (such as the terminal device shown in FIG. 1) having an audio input interface through the network, and the terminal device may acquire the voice information output by the user through the audio input interface, encode the voice information to generate a voice input signal, and then transmit the same to the electronic device on which the method for providing a voice service runs through the network.

Generally, a voice interaction application may be installed on a terminal device having an audio input device (such as a microphone), a user may wake up a voice assistant by gestures, specific keys or specific audio signals. Then the terminal device may detect the voice output by the user and encode the detected voice to generate a voice input signal. Thereafter, in order to acquire response data corresponding to the voice input signal, the terminal device may request to connect to a voice server and transmit the voice input signal to the voice server. The voice server may receive the voice input signal generated by the terminal device through the network.

Step 202: analyzing the time-domain waveform of the voice input signal to determine current speed information of the voice input signal.

The voice input signal generally comprises characteristics such as frequency, tone, intensity and timbre. In the present embodiment, the voice input signal may be expressed as a time-domain waveform with intensity changing with time, The time-domain waveform of the voice input signal may be analyzed, from which speed information may be extracted as the current speed information of the voice input signal.

Figure 3:
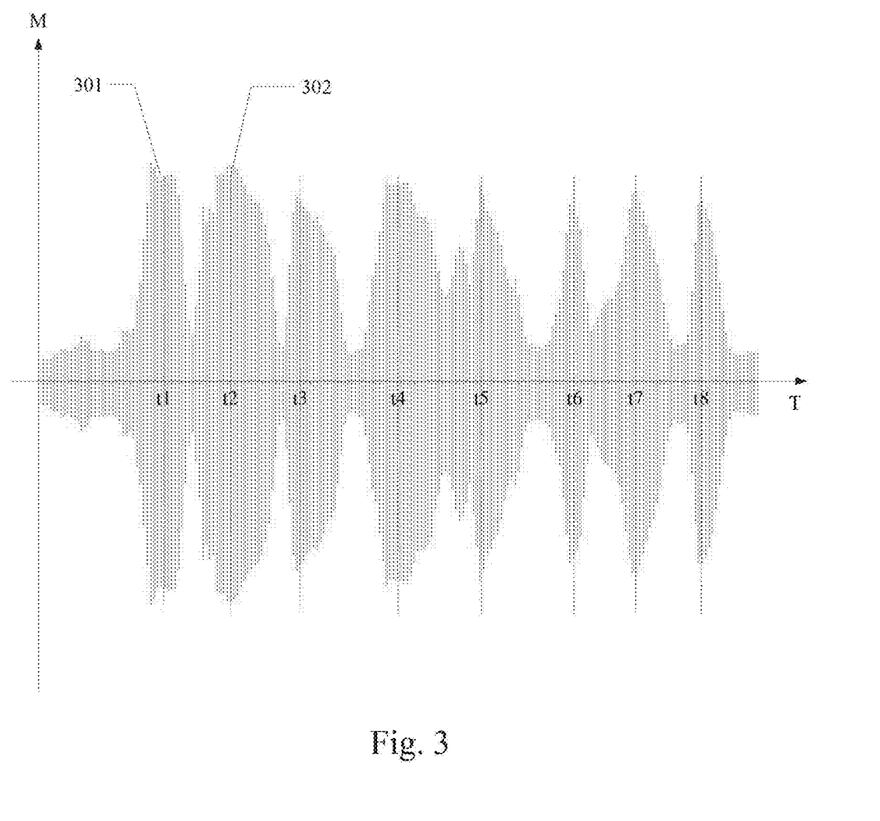
FIG. 3 is a schematic time-domain waveform diagram of a voice input signal according an embodiment.

Specifically, reference is made to FIG. 3 which shows a schematic time-domain waveform diagram of a segment of a voice input signal, wherein the abscissa is time (t) and they ordinate is intensity (m) according to an embodiment, In general, the intensity of the voice input signal generated when the user speaks changes with time, and the intensity is larger at each peak (for example 301, 302), corresponding to one byte in the voice signal. One byte here may be, for example, one initial syllable or one final syllable in Chinese or one syllable in English.

In the present embodiment, the peak of the time-domain waveform of the voice input signal may be detected, then the time interval between two adjacent peaks may be calculated, and the current speed information of the voice input signal may be determined based on the time interval. Specifically, the peaks may be detected in sequence and the corresponding time of each peak may be recorded, then the time intervals between adjacent peaks may be calculated in sequence in sequence of time, after which, the obtained multiple time intervals may be subject to fusion operation, for example, the average value may be calculated, and the current speed information may be determined based on the calculation result, For example, time points t1, t2, t3, t4, t5, t6, t7 and t8 corresponding to eight peaks are detected in the time-domain waveform diagram of the voice input signal shown in FIG. 3, Then, the time interval $\Delta t1$ between t2 and t1, the time interval $\Delta t2$ between t3 and t2, the time interval $\Delta t3$ between t4 and t3, the time interval $\Delta t4$ between t5 and t4, the time interval $\Delta t5$ between t6 and t5, the time interval $\Delta t6$ between t7 and t6 and the time interval $\Delta t7$ between t8 and t7 are sequentially calculated, after that the average value of the seven time intervals $\Delta t1$, $\Delta t2$, $\Delta t3$, $\Delta t4$, $\Delta t5$, $\Delta t6$ and $\Delta t7$ are calculated, the average value represents the average time interval during which two syllables are uttered. This average time interval may be took as the current speed information.

In some optional implementations of the present embodiment, the detected peaks may be filtered after detection of the peaks and before the determination of the current speed information. Specifically, statistics on the intensities of the detected peaks may be performed, and then a confidence range may be determined based on the distribution of the detected intensities, and the peaks with intensity outside the confidence range may be removed. For example, when 90% of the detected peaks have intensities above m1, the remaining 10% of peaks with intensities below m1 may be removed. In this way, ambient noise may be filtered from the voice input signal, which avoids the influence of the ambient noise on the accuracy of current speed information.

Step 203: comparing the current speed information with an acquired standard speed information set of a user outputting the voice input signal, and determining first demand information from a preset demand information set according to the comparison result.

The standard speed information set may comprise at least one piece of standard speed information. The standard speed information may be speed information of the user in a certain emotional state which is pre-registered by the user or learnt by the electronic device on the basis of a historical voice record of the user. For example, the standard speed information may at least comprise the speed information of the user in a calm state. Optionally, the standard speed information set may also comprise the speed information of the user in the emotional states such as anxious, exciting, upset and sad states. The standard speed information may be a specific numerical representation of speed or a numerical range representation of speed. Alternatively, each piece of the standard speed information may be represented by the time interval required by the user to utter two adjacent syllables in the corresponding emotional state, or by the number of syllables per unit time.

For example, if the speed of the user is 0.6 second/word to 0.8 second/word in a calm state, 0.3 second/word to 0.5 second/word in an anxious state, and 0.9 second/word to 1.2 second/word in an upset state, the standard speed information set of the user may be set to comprise the following three pieces of standard speed information: 0.6 second/word to 0.8 second/word, 0.3 second/word to 0.5 second/word and 0.9 second/word to 1.2 second/word that are respectively corresponding to the speed in the above three different emotional states.

The preset demand information set comprises demand information corresponding to each piece of the standard speed information in the standard speed information set. Here, the demand information may be the information indicating the demand of the user for voice service such as emotion, response mode and response speed, and may comprise but not limited to emotion demand information or response speed demand information. In the present embodiment, the demand information corresponding to different standard speed information may be preset. For example, corresponding emotion demand information may be set according to the emotion state of the user corresponding to the standard speed information, or the response speed information may be set to be consistent with the corresponding standard speed information.

In the present embodiment, the current speed information is compared with each piece of the standard speed information in the standard speed information set, and the demand information corresponding to the standard speed information closest to the current speed information in the comparison result is used as the first demand information.

In some optional implementations of the present embodiment, the first demand information may be determined by: comparing the current speed information with an acquired standard speed information set of a user outputting the voice input signal to determine from the standard speed information set target standard speed information matching the current speed information; and finding, in the preset demand information set, demand information corresponding to the target standard speed information as the first demand information.

In a specific example, the standard speed information in the standard speed information set is represented by the numerical range of the speed. If the current speed information falls into one of the numerical ranges, the standard speed information defined by the numerical range may be determined as the target speed information, and then the demand information corresponding to the target standard speed may be found as the first demand information according to the corresponding relation between the demand information in the preset demand information set and the standard speed information.

Step 204: generating a voice response signal based on the first demand information and the second demand information acquired by analyzing the voice input signal.

In the present embodiment, the above-mentioned electronic device may analyze the content of the voice input signal to acquire the second demand information. Specifically, the voice input signal may be converted into text information, and then the text information may be analyzed with the existing demand analysis method to obtain the second demand information. For example, keywords in the text information may be acquired by word segmentation and keyword extraction, and then keyword matching may be used to determine the second demand information.

Then, the electronic device may respond to the voice input signal based on the first demand information and the second demand information to generate a voice response signal. For example, if the voice input signal is rapid "playing music", the determined first demand information is "sharp and fast", and the second demand information is "searching for music in the music library and playing with the speaker", then intense music with fast rhythm may be found from the music library to generate a voice response signal.

In some optional implementations of the present embodiment, step 204 may be performed by: generating at least one candidate voice signal for responding to the voice input signal on the basis of the second demand information, calculating the degree of association between each candidate voice signal and the first demand information, and determining a voice response signal from the candidate voice signals according to the degree of association.

Specifically, in the above implementation, the electronic device may determine a plurality of candidate voice signals according to the second demand information. For example, when the voice input signal is "playing some music", it is determined that the second demand information is playing music, then, a plurality of different types of music may be selected to generate different candidate voice signals respectively.

Then, the degree of association between each candidate voice signal and the first demand information may be calculated. Specifically, attribute characteristics of the each candidate voice signal may be extracted, the degree of association between the attribute characteristics of the each candidate voice signal and the first demand information may be calculated respectively, and then the candidate voice signal with the highest degree of association may be selected as the voice response signal. For example, after a plurality of different types of music are determined to generate different candidate voice signals, if it is determined that the first demand information is "intense and cheerful" according to the current speed information, cheerful music with strong sense of rhythm may be selected as the voice response signal.

After generating the voice response signal, the electronic device may transmit the same to the terminal device, and the terminal device may output the voice response signal through the audio output interface (speaker).

An exemplary application scenario of the present embodiment according to the present disclosure may be as follows: when a user turns on a smart voice device and inquiries about the weather, if the user speaks "weather" at a speed higher than the average speed thereof, the smart voice device may inquire about the weather and briefly broadcast it, for example, it is sunny today, it is 15 to 23° C. If the user speaks "What's the weather like today" at a speed that is about the same as his/her average speed, the smart voice device may inquire about the weather and broadcast it in detail, for example, it is partly cloudy during the daytime today with a gentle north breeze and a maximum temperature 23° C., it will be clear at night with light north breeze and a minimum temperature 15° C., and the air quality is excellent. In this way, the response mode may be adaptively adjusted according to the speed of the user, and differentiated services based on the speed of a speaker is realized.

by The method for providing a voice service according to the above-mentioned embodiments of the present disclosure by: acquiring a voice input signal; performing frequency analysis on the voice input signal to determine current speed information of the voice input signal; comparing the current speed information with an acquired standard speed information set of the user outputting the voice input signal, and determining first demand information from a preset demand information set according to the comparison result, wherein the standard speed information set comprises at least one piece of standard speed information, and the preset demand information set comprises demand information corresponding to each standard speed information in the standard speed information set; and finally generating a voice response signal based on the first demand information and the second demand information acquired by analyzing the voice input signal, may respond in combination with the emotional states and others that comprised in the speed information of a user when providing a voice service, thereby improves the match between the voice service and the potential demand of a user, thus implementing a more flexible and more accurate voice service.

In some embodiments, the method further comprises building a standard speed information set of the user. Specifically, the building the standard speed information set of the user may comprise:

S1: acquiring a historical voice service record associated with the user, the historical voice service record comprising speed information of a historical voice input signal output by the user, a historical voice response signal and feedback information of the user to a historical voice service. Here, the historical voice service record associated with the user outputting the voice input signal may be acquired by querying a voice service log. The historical voice response signal may comprise a voice signal which is for responding to a voice service request of a user and is generated by the electronic device in the historical voice service, and the feedback information of the user to the historical voice service may comprise information such as the evaluation and scoring of the user on the historical voice service.

S2: selecting a historical voice response signal corresponding to a historical voice service having the feedback information being positive feedback information as a sample voice response signal, and selecting speed information of a historical voice input signal corresponding to the historical voice service having the feedback information being positive feedback information as sample speed information.

In step S2, historical voice service records with positive evaluation (like, for instance) and scores higher than a preset score threshold may be selected, the historical voice response signals in the selected historical voice service records are took as the sample voice response signals, and the speed information of the historical voice input signals in the selected historical voice service records are took as the sample speed information.

S3: analyzing the sample voice response signal to determine corresponding third demand information associated with speed, clustering the voice response signal on the basis of the third demand information, and generating each standard speed information based on the sample speed information corresponding to the voice response signals in each cluster.

Specifically, in step S3, the sample voice response signal may be transcoded, and the text information generated by transcoding may be analyzed to determine the speed-related third demand information of the user in the corresponding historical service record. The third demand information here is speed-related demand information which is obtained by analyzing the historical voice response information with positive feedback from the user, and may accurately represent the real demand of the user in the historical voice service record. The speed-related third demand information may be the speed information of the corresponding historical voice response information, and also may be the emotional state information extracted from the corresponding historical voice response information, or speed-related information, such as the length and complexity, in the content contained in the corresponding historical voice response information.

After the third demand information is obtained, voice response signals may be clustered based on the third demand information, the voice response information with same third demand information or same category of third demand information may be clustered into one category. Then for each cluster, statistics is performed in the cluster on the sample speed information corresponding to each voice response signal, for example the statistics on the range or average value of a sample speed information in a cluster is performed, and the range or average value are took as the standard speed information corresponding to the cluster. In this way, a plurality of standard speed information in one-to-one correspondence with the each cluster may be obtained, and further a standard speed information set may be generated. Wherein the each standard speed information corresponds to the same third demand information or to the same or similar third demand information, and different standard speed information corresponds to different or dissimilar third demand information By collecting the feedback information of a user and using the same to build a standard speed information set, the speed information of the corresponding voice response signal of the user in different demand states may be obtained more accurately, and thus may be applied in the demand information recognition in the voice service process to more accurately match the potential demands of the user.

Figure 4:
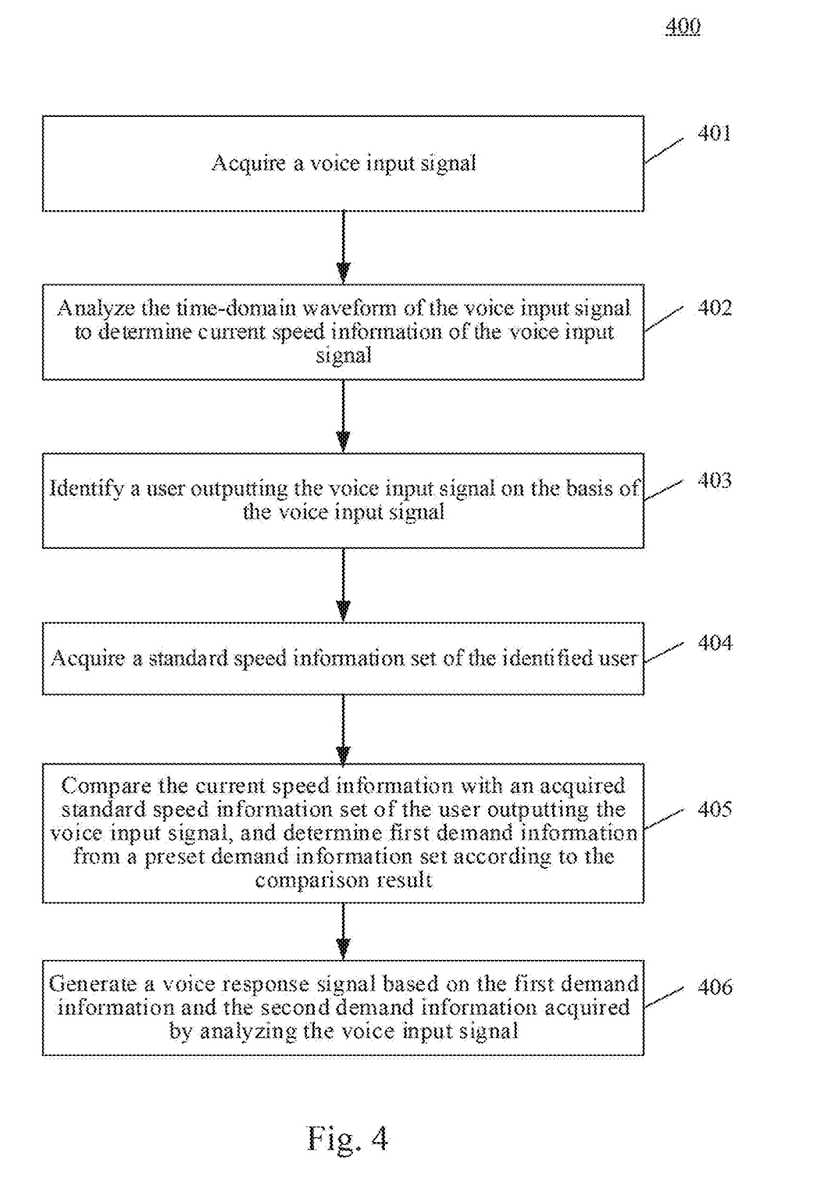
FIG. 4 is a flowchart of a method for providing a voice service according to another embodiment of the present disclosure.

Referring to FIG. 4 that shows a flow chart of a method for providing a voice service according to another embodiment of the present disclosure. As shown in FIG. 4, a flow 400 of a method for providing a voice service according to the present embodiment may comprise:

Step 401: acquiring a voice input signal.

In the present embodiment, an electronic device (such as the server shown in FIG. 1) the method for providing a voice service runs thereon may establish a connection to a terminal device (such as the terminal device shown in FIG. 1) having an audio input interface through the network, and the terminal device may acquire the voice information output by the user through the audio input interface, encode the voice information to generate a voice input signal, and then transmit the same to the electronic device on which the method for providing a voice service runs through the network.

Step 402: analyzing the time-domain waveform of the voice input signal to determine current speed information of the voice input signal.

In the present embodiment, the voice input signal may be expressed as a time-domain waveform with intensity changing with time. The time-domain waveform of the voice input signal may be analyzed, the peak of the time-domain waveform of the voice input signal may be detected, then the time interval between two adjacent peaks may be calculated, and the current speed information of the voice input signal may be determined based on the time interval.

Step 403: identifying the user outputting the voice input signal on the basis of the voice input signal.

In the present embodiment, the identity of the user outputting the voice input signal may be identified. Specifically, various voiceprint identification methods may be used for the identification. An alternative way is to convert the voice input signal into a frequency domain signal, then extract a voiceprint characteristic from the frequency domain signal by filtering and other methods, and match the voiceprint characteristic with the voiceprint characteristic of registered users to identify the identity of the user outputting the voice input signal.

In another optional implementation, timbre characteristic and tone characteristic may be extracted from the voice input signal, and match the timbre characteristic and tone characteristic of the voice input signal with the timbre characteristic and tone characteristic of the registered users, to determine the identity of the user outputting the voice input signal.

A user may register his/her own audio information through a terminal device (for example a smart speaker). The terminal device may store the device ID in association with the voiceprint characteristic, timbre characteristic and tone characteristic and etc. extracted from the audio information. When the identity of the user is being identified, the device ID may be identified by the match based on the voiceprint characteristics, timbre characteristics, tone characteristics and etc., and further the identity of the user may be identified. Optionally, the user may also register his/her own user account, and the terminal device may store the user account in association with the voiceprint characteristic, timbre characteristic, tone characteristic and etc. extracted from the audio information of the user. When the user is being identified, the user account may be identified by the match based on the voiceprint characteristics, timbre characteristics, tone characteristics and etc.

Step 404: acquiring a standard speed information set of the identified user.

In the present embodiment, the electronic device may store a standard speed information set associated with a plurality of different users. The standard speed information set of the user may comprise at least one piece of standard speed information. The standard speed information may be speed information of the user in a certain emotional state which is pre-registered by the user or learnt by the electronic device according to a historical voice record of the user, and the standard speed information may at least comprise the speed information of the user in a clam state. After the identity of the user is identified, a standard speed information set associated with the account or device ID of the user may be retrieved according to the account or the device ID. In this way, personalized standard speed information sets may be built for different users, which is conducive to providing personalized voice service according to the speed characteristics of the users.

Step 405: comparing the current speed information with an acquired standard speed information set of a user outputting the voice input signal, and determining first demand information from a preset demand information set according to the comparison result.

The preset demand information set may comprise demand information corresponding to each piece of the standard speed information in the standard speed information set. Here, the demand information may be the information indicating the demand of the user for voice service such as emotion, response mode and response speed, and may comprise emotion demand information or response speed demand information. In the present embodiment, the demand information corresponding to different standard speed information of the user that identified in step 402 may be preset. The current speed information is compared with each standard speed information in the standard speed information set, and the demand information corresponding to the standard speed information closest to the current speed information in the comparison result is used as the first demand information.

Step 406: generating a voice response signal based on the first demand information and the second demand information obtained by analyzing the voice input signal.

In the present embodiment, the electronic device may convert the voice input signal into text information, and then analyze the text information with the existing demand analysis method to obtain the second demand information. For example, keywords in the text information may be obtained by word segmentation and keyword extraction, and then keyword matching may be used to determine the second demand information.

Then, the electronic device may respond to the voice input signal based on the first demand information and the second demand information to generate a voice response signal. For example, if the voice input signal is rapid "playing music", the determined first demand information is "sharp and fast", and the second demand information is "searching for music in the music library and playing with the speaker", then intense music with fast rhythm may be found from the music library to generate a voice response signal.

Steps 401, 402, 405 and 406 in the method flow are the same as steps 201, 202, 203 and 204 in the embodiments above respectively, and the descriptions about steps 201, 202, 203 and 204 are also applicable to steps 401, 402, 405 and 406 in the present embodiment, so that such steps will not be repeated here.

As shown in FIG. 4, the present embodiment adds the steps of identifying an identity of a user based on a voice input signal and acquiring a standard speed information set of the identified user compared with the embodiment shown in FIG. 2. Therefore, the method for providing a voice service in the present embodiment fully considers the differences between the speed of different users, and may provide personalized voice services for the users.

Figure 5:
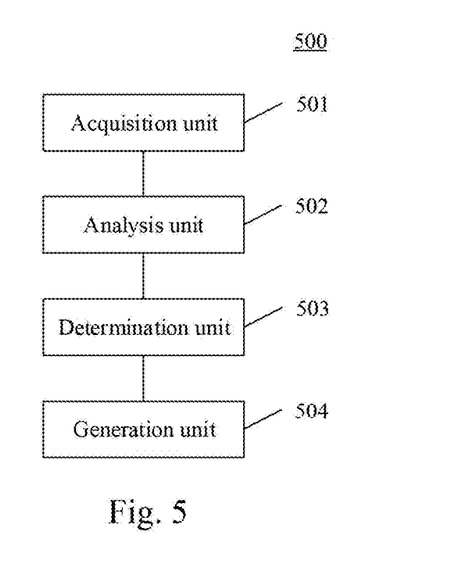
FIG. 5 is a structural diagram of an apparatus for providing a voice service according to an embodiment of the present disclosure.

Referring further to FIG. 5, the present disclosure, as an implementation of the method shown in the figures above, provides an embodiment of an apparatus for providing a voice service. The apparatus embodiments are corresponding to the method embodiments shown in FIG. 2, and the apparatus may be specifically applied to various electronic devices.

As shown in FIG. 5, the apparatus 500 for providing a voice service according to the present embodiment comprises an acquisition unit 501, an analysis unit 502, a determination unit 503 and a generation unit 504. Wherein the acquisition unit 501 is configured for acquiring a voice input signal; the analysis unit 502 is configured for analyzing the time-domain waveform of the voice input signal to determine current speed information of the voice input signal; the determination unit 503 is configured for comparing the current speed information with an acquired standard speed information set of a user outputting the voice input signal, and determining first demand information from a preset demand information set according to the comparison result, wherein the standard speed information set comprises at least one piece of standard speed information, and the preset demand information set comprises demand information corresponding to each standard speed information in the standard speed information set; and the generation unit 504 is configured for generating a voice response signal based on the first demand information and the second demand information obtained by analyzing the voice input signal.

In the present embodiment, the acquisition unit 501 may establish a connection to a terminal device (the terminal device as shown in FIG. 1, for instance) having an audio input interface through the network, and receive from the terminal device an encoded voice input signal of a user that is acquired through the audio input interface.

The analysis unit 502 may analyze the time-domain waveform of the voice input signal, and may specifically detect peaks in the time-domain waveform, calculate the time interval between two adjacent peaks, and estimate the speed corresponding to the voice input signal based on the statistic results on the time intervals between all the adjacent peaks, the speed is took as the current speed information of the voice input signal.

The determination unit 503 may first match the current speed information with a standard speed information set comprising speed information or speed information of the user in different emotional states that is pre-registered or leant by the electronic device according to the historical voice record of the user. In the present embodiment, the electronic device may acquire a preset demand information set comprising a plurality of preset demand information, and the preset demand information may comprise emotion demand information, response mode demand information, response speed demand information and speed demand information of a response signal. The corresponding relation between each preset demand information and each standard speed information in the standard speed information set is predefined, so that the corresponding preset demand information maybe quickly found as the first demand information after the standard speed information matching the current speed information is determined.

The generation unit 504 may analyze the content of the voice input signal, and obtain the second demand information based on the analyzed voice content. Then, a voice response signal may be generated by combining the first demand information and the second demand information, that is, response information matching both the first demand information and the second demand information may be searched in network data, or the response information which may meet both the first demand information and the second demand information may be generated by using a machine learning model and others, and the response information is converted into a voice signal to generate a voice response signal, thus realizing an intelligent voice service.

The apparatus 500 for providing a voice service according to the embodiments of the present disclosure may improve the match between a voice service and the potential demand of a user, thereby making the voice service more flexible and more accurate by: acquiring, by the acquisition unit, a voice input signal; performing frequency analysis, by the analysis unit, on the voice input signal to determine current speed information of the voice input signal; comparing, by the determination unit, the current speed information with an acquired standard speed information set of a user outputting the voice input signal; and finally generating, by the generation unit, a voice response signal based on the first demand information and the second demand information acquired by analyzing the voice input signal.

In some embodiments, the determination unit 503 may be further configured for determining the first demand information by: comparing the current speed information with an acquired standard speed information set of a user outputting the voice input signal to determine from the standard speed information set target standard speed information matching the current speed information; and finding, in the preset demand information set, demand information corresponding to the target standard speed information as the first demand information.

In some embodiments, the apparatus 500 may further comprise an identification unit configured for: before the comparing the current speed information with an acquired standard speed information set of a user outputting the voice input signal, and determining first demand information from a preset demand information set according to the comparison result, identifying a user outputting the voice input signal on the basis of the voice input signal; and acquiring a standard speed information set of the identified user. Therefore, different personalized voice services may be provided for different users according to their own speed.

In some embodiments, the generation unit 504 may be further configured for generating the voice response signal by: generating at least one candidate voice signal for responding to the voice input signal on the basis of second demand information; and calculating the degree of association between the each candidate voice signal and the first demand information, and determining the voice response signal from the candidate voice signal according to the degree of association.

In some embodiments, the apparatus 500 may further comprise a building unit configured for building the standard speed information set of the user. The building unit may be configured for: acquiring a historical voice service record associated with the user, the historical voice service record comprising speed information of a historical voice input signal output by the user, a historical voice response signal and feedback information of the user to a historical voice service; selecting a historical voice response signal corresponding to a historical voice service having feedback information being positive feedback information as a sample voice response signal, and selecting speed information of a historical voice input signal corresponding to the historical voice service having feedback information being positive feedback information as sample speed information; and analyzing the sample voice response signal to determine corresponding third demand information associated with speed, clustering the voice response signal on the basis of the third demand information, and generating each standard speed information according to the sample speed information corresponding to the voice response signal in each cluster. The satisfaction level of the user on the voice response signal at each speed is accurately described on the basis of the feedback of the user, so as to build a standard speed set of the user, which is beneficial to determining the demand information of the user at different speed more accurately, thereby realizing a more accurate voice service. It should be understood that the units recorded in the apparatus 500 may be corresponding to the steps in the method described in FIG. 2 and FIG. 4. Therefore, the operations and characteristics described for the method are also applicable to the apparatus 500 and the units comprised therein, and such operations and characteristics will thus not be repeated here.

Figure 6:
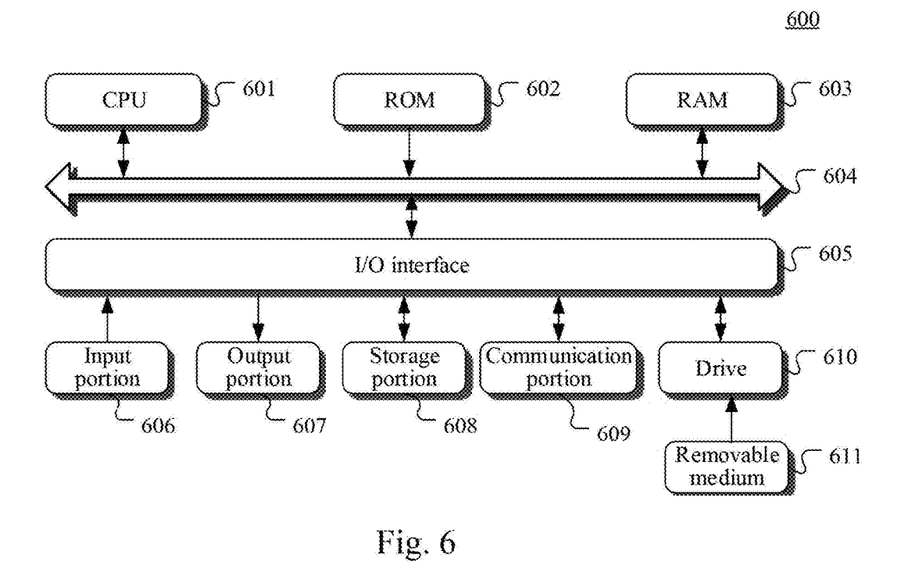
FIG. 6 is a structural diagram of a computer system of a server for implementing the embodiments of the present disclosure.

Referring to FIG. 6, a schematic structural diagram of a computer system 600 adapted to implement a server of the embodiments of the present disclosure is shown. The terminal device or the server are merely an example, and should impose any limitation on the functionality and usage range of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an acquisition unit, an analysis unit, a determination unit, and a determination unit, where the names of these units or modules do not in some cases constitute a limitation to such units or modules themselves. For example, the acquisition unit may also be described as "a unit for acquiring voice input signal."

In another aspect, the present disclosure further provides a computer-readable medium. The computer-readable medium may be the computer medium included in the apparatus in the above described embodiments, or a stand-alone computer-readable medium not assembled into the apparatus. The computer-readable medium stores one or more programs. The one or more programs, when executed by a device, cause the device to: acquire a voice input signal; analyze a time-domain waveform of the voice input signal to determine current speed information of the voice input signal; compare the current speed information with an acquired standard speed information set of a user outputting the voice input signal, determine first demand information from a preset demand information set based on a comparison result, wherein the standard speed information set comprises at least one piece of standard speed information, and the preset demand information set comprises demand information corresponding to each piece of standard speed information in the standard speed information set; and generate a voice response signal based on the first demand information and second demand information acquired by analyzing the voice input signal.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for providing a voice service, comprising:
acquiring a voice input signal;
analyzing a time-domain waveform of the voice input signal to determine current speed information of the voice input signal;
comparing the current speed information with an acquired standard speed information set of a user outputting the voice input signal, determining first demand information from a preset demand information set according to a comparison result, wherein the standard speed information set comprises at least one piece of standard speed information, and the preset demand information set comprises demand information corresponding to each piece of standard speed information in the standard speed information set; and
generating a voice response signal based on the first demand information and second demand information acquired by analyzing the voice input signal,
wherein the method is performed by at least one processor.

2. The method according to claim 1, wherein the comparing the current speed information with an acquired standard speed information set of a user outputting the voice input signal, and determining first demand information from a preset demand information set according to the comparison result comprises:
comparing the current speed information with the acquired standard speed information set of the user outputting the voice input signal to determine from the standard speed information set a target standard speed information matching the current speed information; and
finding, in the preset demand information set, demand information corresponding to the target standard speed information as the first demand information.

3. The method according to claim 1, wherein, before the comparing the current speed information with the acquired standard speed information set of the user outputting the voice input signal, and the determining first demand information from the preset demand information set according to the comparison result, the method further comprises:
identifying the user outputting the voice input signal on the basis of the voice input signal; and
acquiring the standard speed information set of the identified user.

4. The method according to claim 1, wherein the generating a voice response signal based on the first demand information and the second demand information acquired by analyzing the voice input signal comprises:
generating at least one candidate voice signal responding to the voice input signal on the basis of the second demand information; and
calculating a degree of association between the each candidate voice signal and the first demand information, and determining the voice response signal from the candidate voice signal according to the degree of association.

5. The method according to claim 1, wherein the method further comprises building the standard speed information set of the user, comprising:
acquiring a historical voice service record associated with the user, the historical voice service record comprising speed information of a historical voice input signal outputted by the user, a historical voice response signal and feedback information of the user to a historical voice service;
selecting a historical voice response signal corresponding to a historical voice service including the feedback information being positive feedback information as a sample voice response signal, and selecting speed information of a historical voice input signal corresponding to the historical voice service including the feedback information being positive feedback information as sample speed information; and
analyzing the sample voice response signal to determine corresponding third demand information associated with speed, clustering the voice response signal on the basis of the third demand information, and generating the each standard speed information according to the sample speed information corresponding to the voice response signal in each cluster.

6. An apparatus for providing a voice service, comprising:
at least one processor; and
a memory storing instructions, the instructions when executed by the at least one processor, cause the at least one processor to perform operations, the operations comprising:
acquiring a voice input signal;
analyzing a time-domain waveform of the voice input signal to determine current speed information of the voice input signal;
comparing the current speed information with an acquired standard speed information set of a user outputting the voice input signal, and determining first demand information from a preset demand information set according to a comparison result, wherein the standard speed information set comprises at least one piece of standard speed information, and the preset demand information set comprises demand information corresponding to each piece of standard speed information in the standard speed information set; and
generating a voice response signal based on the first demand information and second demand information acquired by analyzing the voice input signal.

7. The apparatus according to claim 6, wherein the comparing the current speed information with an acquired standard speed information set of a user outputting the voice input signal, and determining first demand information from a preset demand information set according to the comparison result comprises:
comparing the current speed information with an acquired standard speed information set of the user outputting the voice input signal to determine from the standard speed information set a target standard speed information matching the current speed information; and
finding, in the preset demand information set, demand information corresponding to the target standard speed information as the first demand information.

8. The apparatus according to claim 6, wherein,
before comparing the current speed information with an acquired standard speed information set of a user outputting the voice input signal and determining first demand information from a preset demand information set according to the comparison result, the operations further comprising:
identifying the user outputting the voice input signal on the basis of the voice input signal; and
acquiring the standard speed information set of the identified user.

9. The apparatus according to claim 6, wherein the generating a voice response signal based on the first demand information and the second demand information acquired by analyzing the voice input signal comprises:

generating at least one candidate voice signal responding to the voice input signal on the basis of the second demand information; and     calculating a degree of association between the each candidate voice signal and the first demand information, and determining the voice response signal from the candidate voice signal according to the degree of association.

10. The apparatus according to claim 6, wherein the operations further comprises building the standard speed information set of the user, comprising:

acquiring a historical voice service record associated with the user, the historical voice service record comprising speed information of a historical voice input signal output by the user, a historical voice response signal and feedback information of the user to a historical voice service;

selecting a historical voice response signal corresponding to a historical voice service including the feedback information being positive feedback information as a sample voice response signal, and selecting speed information of a historical voice input signal corresponding to the historical voice service including the feedback information being positive feedback information as sample speed information; and     analyzing the sample voice response signal to determine corresponding third demand information associated with speed, clustering the voice response signal based on the third demand information, and generating each standard speed information according to the sample speed information corresponding to the voice response signal in each cluster.

11. A non-transitory computer readable storage medium storing a computer program, wherein the computer program, when executed by a processor, cause the processor to perform operations, the operations comprising:

acquiring a voice input signal;

analyzing a time-domain waveform of the voice input signal to determine current speed information of the voice input signal;

comparing the current speed information with an acquired standard speed information set of a user outputting the voice input signal, determining first demand information from a preset demand information set according to a comparison result, wherein the standard speed information set comprises at least one piece of standard speed information, and the preset demand information set comprises demand information corresponding to each piece of standard speed information in the standard speed information set; and     generating a voice response signal based on the first demand information and second demand information acquired by analyzing the voice input signal.

* * * * *